United States Patent
Walker

(10) Patent No.: US 12,077,674 B2
(45) Date of Patent: Sep. 3, 2024

(54) CONDUCTIVE INK COMPOSITIONS COMPRISING PALLADIUM AND METHODS FOR MAKING THE SAME

(71) Applicant: ELECTRONINKS INCORPORATED, Austin, TX (US)

(72) Inventor: Steven Brett Walker, Austin, TX (US)

(73) Assignee: ELECTRONINKS INCORPORATED, Austin, TX (US)

( * ) Notice: Subject to any disclaimer, the term of this patent is extended or adjusted under 35 U.S.C. 154(b) by 0 days.

(21) Appl. No.: 18/317,082

(22) Filed: May 14, 2023

(65) Prior Publication Data

US 2024/0150603 A1 May 9, 2024

Related U.S. Application Data

(63) Continuation of application No. 16/636,154, filed as application No. PCT/US2018/045276 on Aug. 3, 2018, now Pat. No. 11,649,366.

(60) Provisional application No. 62/540,829, filed on Aug. 3, 2017.

(51) Int. Cl.
| | |
|---|---|
| C09D 11/52 | (2014.01) |
| C09D 5/24 | (2006.01) |
| C09D 11/033 | (2014.01) |
| C09D 11/037 | (2014.01) |
| C09D 11/322 | (2014.01) |
| C09D 11/38 | (2014.01) |
| C23C 18/08 | (2006.01) |

(52) U.S. Cl.
CPC ............... *C09D 11/52* (2013.01); *C09D 5/24* (2013.01); *C09D 11/033* (2013.01); *C09D 11/037* (2013.01); *C09D 11/322* (2013.01); *C09D 11/38* (2013.01); *C23C 18/08* (2013.01)

(58) Field of Classification Search
CPC ........ C09D 11/52; C09D 5/24; C09D 11/033; C09D 11/037; C09D 11/322; C09D 11/38; C23C 18/08
See application file for complete search history.

(56) References Cited

U.S. PATENT DOCUMENTS

| | | | |
|---|---|---|---|
| 6,197,366 B1 | 3/2001 | Takamatsu | |
| 9,469,773 B2 | 10/2016 | Walker et al. | |
| 2005/0005820 A1 | 1/2005 | Etheridge | |
| 2008/0034921 A1 | 2/2008 | Vanheusden et al. | |
| 2009/0148600 A1 | 6/2009 | Li et al. | |
| 2013/0200312 A1 | 8/2013 | Wu | |
| 2013/0202795 A1 | 8/2013 | Wu | |
| 2013/0221288 A1 | 8/2013 | Liu et al. | |
| 2014/0079954 A1* | 3/2014 | Wu ........................ | C09D 11/52 252/514 |
| 2015/0232709 A1 | 8/2015 | Matsui et al. | |
| 2015/0344714 A1 | 12/2015 | Wu et al. | |
| 2018/0114609 A1* | 4/2018 | Tomura ................... | H01B 5/14 |
| 2019/0062582 A1* | 2/2019 | Keoshkerian ....... | C23C 18/1692 |
| 2019/0249026 A1* | 8/2019 | Gwengo ............. | D06M 15/564 |
| 2021/0277268 A1* | 9/2021 | Martin ................. | B41M 5/0023 |

FOREIGN PATENT DOCUMENTS

JP 10-072673 A 3/1998

* cited by examiner

*Primary Examiner* — Mark Kopec
*Assistant Examiner* — Jaison P Thomas
(74) *Attorney, Agent, or Firm* — David A. Roise; VLP Law Group LLC

(57) ABSTRACT

Disclosed herein are ink compositions for making a conductive palladium structure. For example, the ink composition can comprise a palladium salt and a complex of a complexing agent and a short chain carboxylic acid or salt thereof. In some embodiments, a second or third metal salt is included in the compositions. Also disclosed herein are methods for making and using such conductive ink compositions.

11 Claims, No Drawings

CONDUCTIVE INK COMPOSITIONS COMPRISING PALLADIUM AND METHODS FOR MAKING THE SAME

CROSS-REFERENCE TO RELATED APPLICATION

This application is a continuation of U.S. application Ser. No. 16/636,154, filed on Feb. 3, 202, which claims the benefit of U.S. Provisional Application No. 62/540,829, filed on Aug. 3, 2017, the disclosures of which are incorporated herein by reference in their entireties.

FIELD OF THE INVENTION

The present disclosure is related generally to conductive ink compositions and more particularly to ink compositions comprising palladium that can be deposited to form highly conductive coatings or patterns as well as catalytically active thin films.

BACKGROUND OF THE INVENTION

The vast majority of commercially produced conductive inks are specifically designed for inkjet, screen-printing, or roll-to-roll processing methods in order to process large areas with fine-scale features in short time periods. These inks have disparate viscosities and synthesis parameters. Particle-based inks are based on conductive metal particles, which are typically synthesized separately and then incorporated into an ink formulation. The resulting ink is then tuned for the specific particle process. Precursor-based inks are based on thermally unstable precursor complexes that reduce to a conductive metal upon heating. Prior particle- and precursor-based methods generally rely on high temperatures to form conductive coatings and thus may not be compatible with substrates that require low processing temperatures to maintain integrity. For example, silver compounds with carbamate or other relatively low molecular weight ligands (compared to polymer stabilizers) have been synthesized that decompose at temperatures near 150° C., yielding electrical conductivities approaching that of bulk silver. Unfortunately, even these temperatures render the ink incompatible with many plastic and paper substrates used in flexible electronic, biomedical, and other types of devices.

Precursor-based silver inks have been obtained at a lower temperature that is more compatible with existing printing media. For example, U.S. Pat. No. 9,469,773 discloses using a complexing agent and a short chain carboxylic acid to reduce silver salt to metal form at a temperature of about 120° C. or less.

Silver is an expensive metal. A cheaper alternative would be more desirable. It is desirable to have an ink based on a metal salt that can be reduced to elemental form at a temperature lower than what is needed to reduce a silver salt. Further, silver ink compositions tend to form silver plate or precipitate silver particles when stored at room temperature for over 2 to 3 days.

What is needed in the art are better compositions and methods for creating high quality conductive metal ink at a conversion temperature that is lower than that of existing conductive ink compositions such as a silver-based ink. What is also needed are ink compositions that are stable and can be stored at room temperature.

SUMMARY OF THE INVENTION

Improved ink compositions for forming conductive structures comprising palladium and methods of making the conductive structures are described herein.

In one aspect, disclosed herein are ink compositions for making a conductive palladium structure, the ink compositions comprising: a palladium salt; and a complex comprising a complexing agent and a short chain carboxylic acid or salt thereof.

In some embodiments, the composition further comprises an additional metal salt, which, when reduced to elemental form, is capable of forming an alloy with palladium.

In some embodiments, the additional metal salt is a silver salt.

In some embodiments, the atomic percentage of the palladium salt is 3% or more than the atomic percentage of the silver salt.

In some embodiments, the short chain carboxylic acid is selected from the group consisting of formic acid, acetic acid, propionic acid, pentanoic acid, and butyric acid.

In some embodiments, the short chain carboxylic acid is formic acid.

In some embodiments, the complexing agent is selected from the group consisting of an alkyl amine and ammonia.

In some embodiments, the alkyl amine is selected from the group consisting of methylamine, ethylamine, propylamine, butylamine, amylamine, isoamylamine, and methoxyethylamine.

In some embodiments, the composition comprises a plurality of complexing agents, for example a plurality of alkyl amine complexing agents.

In some embodiments, the palladium salt is a palladium (I) salt, a palladium (II) salt, or a palladium (III) salt.

In some embodiments, the palladium salt is selected from the group consisting of palladium (II) formate, palladium (II) acetate, palladium (II) carbonate, palladium (II) fluoride, palladium (II) nitrate, palladium (II) nitrite, palladium (II) chloride, palladium (II) bromide, palladium (II) iodide, palladium (II) phosphate, and palladium (II) oxide.

In some embodiments, the composition further comprises methylene diamine or ethylene diamine.

In some embodiments, the composition further comprises a solvent selected from the group consisting of ethanol, butanol, propylene glycol, water, and combinations thereof.

In some embodiments, the composition further comprises elemental palladium, where the elemental palladium is formed by reduction of a portion of the palladium salt.

In some embodiments, the ink composition has a viscosity of between about 1 mPa·s and about $10^6$ mPa·s under low shear conditions.

In some embodiments, the palladium salt is palladium (II) acetate, where the complexing agent is selected from the group consisting of methylamine, ethylamine, propylamine, butylamine, amylamine, isoamylamine, methoxyethylamine, and ammonia, and where the short chain carboxylic acid is formic acid.

In some embodiments, the composition further comprises ethylene diamine.

In some embodiments, the composition further comprises a solvent selected from the group consisting of ethanol, butanol, propylene glycol, water, and combinations thereof.

In another aspect, disclosed herein are ink compositions for making a conductive structure comprising palladium. The ink compositions comprise: a metal salt composition comprising a palladium salt; a complexing agent for dissolving the palladium salt, the complexing agent not being a reducing agent for the palladium salt; and an acid for complexing with the complexing agent and reducing the palladium salt; wherein each of the complexing agent and the acid has a boiling point of about 120° C. or less.

In some embodiments, the metal salt composition further comprises: an additional metal salt, which, when reduced in elemental form, is capable of forming an alloy with palladium.

In some embodiments, the additional metal salt is a silver salt.

In some embodiments, the atomic percentage of the palladium salt is 3% or more than the atomic percentage of the silver salt.

In some embodiments, the composition further comprises a solvent having a boiling point of about 120° C. or less.

In yet another aspect, disclosed herein are methods of making a conductive structure comprising palladium. The methods comprise: combining a metal salt composition comprising a palladium salt and a complexing agent; adding a short chain carboxylic acid or a salt of the short chain carboxylic acid to the combined metal salt composition and complexing agent to form an ink composition; optionally partially evaporating the complexing agent from the ink composition to form a concentrated formulation; and reducing the metal salt composition to form a conductive structure comprising palladium, where the concentrated formulation and the conductive structure comprising palladium are formed at a temperature of about 120° C. or less.

In some embodiments, an additional metal salt is included in the metal salt composition, which, when reduced in elemental form, is capable of forming an alloy with palladium.

In some embodiments, the additional metal salt is a silver salt.

In some embodiments, the atomic percentage of the palladium salt is 3% or more than the atomic percentage of the silver salt.

In some embodiments, the temperature is about 90° C. or less.

In some embodiments, the short chain carboxylic acid or the salt of the short chain carboxylic acid is not added until after the palladium salt is dissolved in the complexing agent.

In some embodiments, the method further comprises depositing the ink composition onto a substrate.

In some embodiments, the ink composition is deposited onto the substrate by a method selected from the group consisting of spray processing, dip coating, spin coating, inkjet printing, and e-jet printing.

In some embodiments, the method further comprises depositing the concentrated formulation onto a substrate.

In some embodiments, the concentrated formulation is deposited onto the substrate by a method selected from the group consisting of screen printing, roll-to-roll processing, and direct ink writing.

In some embodiments, the conductive structure comprises a resistivity of about $2\times10^{-5}$ Ω·cm or less.

One of skill in the art would understand that, when applicable, any embodiments disclosed herein can be applied in any aspect.

DETAILED DESCRIPTION OF THE INVENTION

Disclosed herein are precursor-based palladium conductive ink compositions having one or more of the following characteristics. First, the ink synthesis procedure may be both simple and high-yield. Second, the ink may possess low viscosity so that it is compatible with a broad range of patterning techniques, including direct ink writing, inkjet printing, and airbrush spraying. Third, the patterned features formed by the ink may be highly conductive at room temperature and achieve bulk conductivity upon annealing at mild temperatures (e.g., <100° C.). Finally, the ink may remain stable at room temperature for months without particle precipitation.

Silver is commonly used in electronics. Often it is used as an alloy with more noble elements such as palladium for soldering or other properties such as resistance to oxidation or other harsh environments. However, to date, no a palladium salt or mixed metal salts including a palladium salt have been used as precursors for forming conductive inks.

As used herein, the terms "conductive ink composition", "conductive ink", "ink composition", "ink", or variations thereof can be used interchangeably. In some embodiments, the only conductive material in a palladium ink is palladium. In some embodiments, multiple conductive materials are included in a palladium ink; for example, palladium can be used as a stabilizing additive in a conductive ink based on another metal such as silver. In some embodiments, palladium is used as the main conductive material, and one or more additional conductive materials can be added for desired characteristics.

In some embodiments, the inks are created for printing highly conductive features (>$10^4$ S/cm) at room temperature. In some embodiments, the inks can be stable, particle-free, and suitable for a wide range of patterning techniques. For example, palladium-based ink compositions can be stored at room temperature for over six months without visible precipitation formation. In some embodiments, the compositions can be stored even longer, for up to nine months, up to 12 months, or more than 12 months. The conductive ink composition may be highly transparent and can be printed through highly flexible, ultrafine nozzles (e.g., 100 nm diameter) via direct ink writing. Upon annealing at 90° C., printed electrodes prepared from such inks may exhibit an electrical conductivity equivalent to bulk palladium.

In one aspect, disclosed herein is a conductive ink composition that comprises a palladium salt, a complexing agent (e.g., an alkyl amine or ammonia) and a short-chain carboxylic acid. The complexing agent acts as a weak base, and the short-chain carboxylic acid acts as a reducing agent and a weak acid.

Palladium salt is employed in the ink as a precursor material, which ultimately yields the palladium metal in the conductive palladium coatings, lines, or patterns. Any suitable palladium precursor of different oxidation states can be used, including Pd(I), Pd(II), Pd(III), or Pd(IV). In some embodiments, a salt of Pd(II) can be used. In some embodiments, a salt of Pd(I), Pd(III), or Pd (IV) can be used. In some embodiments, the palladium salts comprise a ligand. In some embodiments, the conjugate acid of the ligand has a boiling point of at most 120° C., such that the conjugate acid of the ligand can be removed under mild conditions during the processing of the conductive ink. In some embodiments, the palladium salt may be palladium acetate, palladium formate, palladium carbonate, palladium fluoride, palladium nitrate, palladium nitrite, palladium chloride, palladium bromide, palladium iodide, palladium phosphate, palladium trifluoroacetate, palladium acetylacetonate, palladium sulfate, or palladium oxide. In some embodiments, the palladium salt is palladium acetate. The conjugate acid of the acetate ligand is acetic acid, which has a boiling point of about 117-118° C. In some embodiments, the palladium salt is palladium formate. The conjugate acid of the formate ligand is formic acid, which has a boiling point of about 100-101° C. In some embodiments, the conjugate acid of the ligand can have a boiling point of up to 180° C. In some embodiments, the conjugate acid of the ligand can have a boiling point of up to 150° C. or less, 140° C. or less, 130° C. or less, 120° C. or less, 110° C. or less, 100° C. or less, 90° C. or less, 80° C. or less, 70° C. or less, or 60° C. or less. In some embodiments, the conjugate acid of the ligand can have a boiling point of about 60-120° C. In some embodiments, the conjugate acid of the ligand can have a boiling point of about 80-100° C. In some embodiments, the conjugate acid of the ligand can have a boiling point of about 70-90° C. In some embodiments, the conjugate acid of the ligand can have a boiling point of about 100-120° C.

In some embodiments, a salt of the short chain carboxylic acid may be used instead of, or in addition to, the short chain carboxylic acid. For example, the salt of the short chain carboxylic acid may be an ammonium salt of the short chain carboxylic acid. The conductive ink serves as a precursor for the fabrication of highly conductive palladium coatings, lines, and patterns. Due to the low boiling points of the non-palladium components, the conductive ink can be processed at low temperatures and can be engineered for compatibility with multiple processing techniques (e.g., ink jet printing, aerosol jet printing, screen-printing, roll-to-roll printing, direct ink writing, electrohydrodynamic jet (e-jet) printing, dip-coating, spin-coating, and spray processing such as by airbrush). Without wishing to be bound by theory, the preparation of the ink takes advantage of an acid-base complex formed between the complexing agent and the short chain carboxylic acid, and the fact that each of the complexing agent, the short chain carboxylic acid, and the optional solvent have low boiling points, ideally boiling points of at most 120° C. At such a temperature, the precursor metal compound is converted into the metal element, and the byproducts and solvent can be fully evaporated.

Accordingly, in some embodiments are provided ink compositions for making a conductive palladium structure, the ink compositions comprising: a palladium salt, and a complex comprising a complexing agent and a short chain carboxylic acid or salt thereof. Said a different way, the disclosure provides ink compositions for making a conductive palladium structure, the ink compositions comprising: a palladium salt; and a complex of (a) a complexing agent and a short chain carboxylic acid or (b) a complexing agent and a salt of a short chain carboxylic acid.

In some embodiments, the solvent can have a boiling point of up to 180° C. In some embodiments, the solvent can have a boiling point of up to 150° C. or less, 140° C. or less, 130° C. or less, 120° C. or less, 110° C. or less, 100° C. or less, 90° C. or less, 80° C. or less, 70° C. or less, or 60° C. or less. In some embodiments, the solvent can have a boiling point of about 60-120° C. In some embodiments, the solvent can have a boiling point of about 80-100° C. In some embodiments, the solvent can have a boiling point of about 70-90° C. In some embodiments, the solvent can have a boiling point of about 100-120° C.

In one aspect, disclosed herein is a conductive ink composition that comprises a palladium salt, at least one additional salt, a complexing agent (e.g., an alkyl amine or ammonia) and a short-chain carboxylic acid. The complexing agent acts as a weak base and the short-chain carboxylic acid acts as a reducing agent and a weak acid.

In some embodiments, the at least one additional salt comprises a second metal. For example, a salt of the second metal (e.g., a silver salt) can be mixed to obtain an alloy-based conductive ink composition. Exemplary second metals include but are not limited to silver.

In some embodiments, the salt of the second metal, when reduced to elemental form, is capable of forming an alloy with elemental palladium.

For example, the second metal salt may be an acetate, a formate, a carbonate, a fluoride, a nitrate, a nitrite, a chloride, a bromide, an iodide, a phosphate, a trifluoroacetate, a acetylacetonate, a sulfate, or an oxide. In some embodiments, the second metal salt is silver acetate. The conjugate acid of the acetate ligand is acetic acid, which has a boiling point of about 117-118° C. In some embodiments, the second metal salt is palladium formate. The conjugate acid of the formate ligand is formic acid, which has a boiling point of about 100-101° C. In some embodiments, the conjugate acid of the ligand can have a boiling point of up to 180° C. In some embodiments, the conjugate acid of the ligand can have a boiling point of up to 150° C. or less, 140° C. or less, 130° C. or less, 120° C. or less, 110° C. or less, 100° C. or less, 90° C. or less, 80° C. or less, 70° C. or less, or 60° C. or less. In some embodiments, the conjugate acid of the ligand can have a boiling point of about 60-120° C. In some embodiments, the conjugate acid of the ligand can have a boiling point of about 80-100° C. In some embodiments, the conjugate acid of the ligand can have a boiling point of about 70-90° C. In some embodiments, the conjugate acid of the ligand can have a boiling point of about 100-120° C.

In some embodiments, the conductive ink composition can include a third metal salt.

Surprisingly, conductive ink compositions including palladium are exceedingly stable. For example, a solution of ammonia and a Pd(II) salt solution (e.g., at a 4:1 molar ratio) can be stored at room temperature for months in ambient lighting with a stoichiometric excess of formate and no visible precipitation or solution changes. Where a similar solution of silver would begin plating out silver or precipitating silver particles in 2 or 3 days.

This unexpected improvement in ink stability can be observed in pure palladium-based ink or in ink compositions with mixed metal salts that include a palladium salt. As disclosed herein, enhanced stability can be observed when the atomic percentage of the palladium salt in an ink composition (e.g., an ink solution) is greater than that of the one or more additional metal salts (e.g., a silver salt). For example, once an atomic percentage of greater than 3% of palladium ions in solution is reached vs. silver ions, a notable increase in solution stability occurs.

As disclosed herein, a conductive "palladium ink" refers to ink compositions including but not limited to a palladium salt. For example, where a description concerning solvents and complexing agents is provided that generally refers to a palladium salt, it should in no way limit the ink composition only to those compositions that contain a palladium salt as the sole metal source.

In one embodiment, the complexing agent is an alkyl amine. To form the conductive ink, the palladium salt, or a mixed metal salt composition thereof, is dissolved in the alkyl amine. An alkyl amine is an amino group substituted by at least one $C_{1-8}$ alkyl group, where an alkyl group refers to a hydrocarbon group which may be linear, cyclic, or branched or a combination thereof having the number of carbon atoms designated (i.e., $C_{1-8}$ s means one to eight carbon atoms). Examples of alkyl groups include methyl, ethyl, n-propyl, isopropyl, n-butyl, t-butyl, isobutyl, sec-butyl, pentyl, isopentyl, cyclohexyl, cyclopentyl, and the like. An alkyl amine may be a primary, secondary or tertiary amine, preferably a primary amine. In some cases, one or more of the carbon atoms in the alkyl group can be substituted with a heteroatom, such as an oxygen, a sulfur, or a nitrogen.

The alkyl amine, which is a weak base, acts as a stabilizer and solvent for the palladium salt. The alkyl amine is not intended to act as a reducing agent for the palladium salt or a mixed metal salt composition thereof (i.e., it does not appreciably reduce the palladium salt or additional metal salt). Any suitable alkyl amine that stabilizes the palladium salt or additional metal salt may be employed. Preferably, the alkyl amine has a boiling point of about 120° C. or less. Examples of alkyl amines having a boiling point of about 120° C. or less include but are not limited to isomers of $C_6H_{15}N$, isomers of $C_5H_{13}N$, isomers of $C_4H_{11}N$, isomers of $C_3H_9N$, isomers of $C_2H_7N$, and isomers of $CH_5N$. For convenience in handling, it may be desirable for the alkyl amine to have a boiling point of about 40° C. or greater. Examples of alkyl amines having boiling points between about 40° C. and 120° C. include, but are not limited to propylamine, n-butyl amine, amylamine, isoamylamine, s-butylamine, diethylamine, triethylamine, iso-butylamine, isopentylamine, 1-methylbutylamine, 1-amino-2-methylbutane, and N-methyldiethylamine. Alternatively, or in addition, the alkyl amine could be methylamine, ethylamine, aniline, propylamine, n-butyl amine, amylamine, s-butylamine, iso-butylamine, isopentylamine, 1-methylbutylamine, 1-amino-2-methylbutane, N-methyldiethylamine, diethylamine, dipropylamine, dibutylamine, or dipentylamine. Alkyl amines comprising ether linkages, for example methoxyethylamine and the like, are also considered suitable for use in the instant compositions. Preferably the amine is propylamine, n-butyl amine, or amylamine; more preferably propylamine or n-butylamine.

In some embodiments, the alkyl amine is selected from the group consisting of methylamine, ethylamine, propylamine, butylamine, amylamine, isoamylamine, and methoxyethylamine. In some embodiments, the alkyl amine is selected from the group consisting of methylamine, ethylamine, propylamine, butylamine, and amylamine.

The alkyl amine may be selected based on its boiling point for a specific application. For deposition methods such as inkjet printing or e-jet, greater stability is generally preferred, and thus it may be preferable to use an alkyl amine with a higher boiling point, such as amyl amine, which has a boiling point of about 104° C. In some aspects it may be desirable to add a short chain diamine (e.g., methylenediamine or ethylenediamine) in addition to the alkyl amine to provide even more stability. However, when ethylenediamine is used alone, the electrical conductivity of the resulting palladium-containing product may not be as high as desired. Therefore, it may be advantageous to employ a combination of an alkyl amine and ethylenediamine, such as amyl amine with ethylenediamine in a given ratio to prepare the silver-based ink. The ratio of alkyl amine to ethylenediamine may fall in the range from about 4:1 to about 1:4 on a volume:volume basis, and is preferably about 1:1. Another short chain diamine such as, for example, methylenediamine may be used instead of, or in addition to, ethylenediamine.

To form the conductive ink, enough alkyl amine may be added such that the short chain carboxylic acid forms a complex with the alkyl amine. Without wishing to be bound by theory, the complex is believed to be formed via an acid base reaction between the short chain carboxylic acid and the alkyl amine. In short, a quaternary ammonium reaction product is formed by the reaction of the short chain carboxylic acid and the alkyl amine. Preferably an excess of alkyl amine is used relative to the short chain carboxylic acid to ensure that the short chain carboxylic acid is complexed and thereby unavailable to act as a reducing agent. The molar ratio of the alkyl amine to the short chain carboxylic acid is at least about 1:1, preferably at least about 2:1, more preferably at least about 4:1. For ease of operability, it may be desirable to add enough amine to dissolve the palladium salt or any additional metal salt. The amount of alkyl amine required may be determined by slowly adding the alkyl amine to the palladium salt and any additional metal salt and monitoring the dissolution of the palladium salt and any additional metal salt. In some aspects, about 2 mL of alkyl amine may be used to dissolve about 1 g of palladium salt or any additional metal salt. Other methods known to one skilled in the art to assist in dissolution of the palladium salt and any additional metal salt including addition of a solvent or other component such as a higher molecular weight alkyl amine or a diamine to assist in dissolution are also contemplated.

In some embodiments, the alkyl amine can have a boiling point of up to 180° C. In some embodiments, the alkyl amine can have a boiling point of up to 150° C. or less, 140° C. or less, 130° C. or less, 120° C. or less, 110° C. or less, 100° C. or less, 90° C. or less, 80° C. or less, 70° C. or less, or 60° C. or less. In some embodiments, the alkyl amine can have a boiling point of about 60-120° C. In some embodiments, the alkyl amine can have a boiling point of about 80-100° C. In some embodiments, the alkyl amine can have a boiling point of about 70-90° C. In some embodiments, the alkyl amine can have a boiling point of about 100-120° C.

In some aspects, it may be desirable to add a solvent to the mixture of the alkyl amine and palladium salt (and any additional metal salt). The solvent preferably has a boiling point of at most 120° C. Examples of suitable solvents include water, alcohols (including for example, methanol, ethanol, 1-propanol, and 2-propanol), esters, ketones, and ethers. Preferably the solvent is water, ethanol, butanol, or propylene glycol. In some aspects, the solvent may include two or more co-solvents. For example, the solvent may include water and another co-solvent such as butanol or propylene glycol. In some embodiments, the solvent can have a boiling point of about 60-120° C. In some embodiments, the solvent can have a boiling point of about 80-100° C. In some embodiments, the solvent can have a boiling point of about 70-90° C. In some embodiments, the solvent can have a boiling point of about 100-120° C.

In another embodiment, the complexing agent is ammonium hydroxide (e.g., ammonia or aqueous ammonia). To form the conductive ink, the palladium salt (and any additional salt, if applicable) is dissolved in the ammonium hydroxide. The ammonium hydroxide, which is a weak base, acts as a stabilizer and solvent for the palladium salt (and any additional salt, if applicable). The ammonium hydroxide is not intended to act as a reducing agent for the palladium ink composition (i.e., it does not appreciably reduce the palladium salt or any additional salt, if applicable).

To form the conductive ink, enough ammonium hydroxide may be added such that the short chain carboxylic acid forms a complex with the ammonium hydroxide. Without wishing to be bound by theory, the complex is believed to be formed via an acid base reaction between the short chain carboxylic acid and the ammonium hydroxide. An excess of ammonium hydroxide may be used relative to the short chain carboxylic acid such that the short chain carboxylic acid is complexed and thereby unavailable to act as a reducing agent. The excess ammonia in solution acts to preferentially complex with formic acid resulting in the in situ synthesis of ammonium formate. The molar ratio of the ammonium hydroxide to the short chain carboxylic acid may be at least about 1:1, preferably at least about 2:1, more preferably at least about 4:1. For ease of operability, it may be desirable to add enough ammonium hydroxide to dissolve the palladium salt (and any additional salt, if applicable). The amount of ammonium hydroxide required may be determined by slowly adding the ammonium hydroxide to the palladium salt and monitoring the dissolution of the palladium salt (and any additional salt, if applicable). In some aspects, about 2.5 mL of ammonium hydroxide may be used to dissolve about 1 g of palladium salt (and any additional salt, if applicable). Other methods known to one skilled in the art to assist in dissolution of the palladium salt (and any additional salt, if applicable) are also contemplated.

In some aspects, it may be desirable to add a solvent to the mixture of the ammonium hydroxide and palladium salt (and any additional salt, if applicable). The solvent preferably has a boiling point of at most 120° C. Examples of suitable solvents include water, alcohols (including for example, methanol, ethanol, 1-propanol, and 2-propanol), esters, ketones, and ethers. Preferably the solvent is water or ethanol.

In any of the embodiments described herein, preferably, after dissolving the palladium salt (and any additional salt, if applicable) in the complexing agent, the short chain carboxylic acid is added to form an ink formulation. The short chain carboxylic acid functions as the reducing agent for the palladium salt (and any additional salt, if applicable). Alternatively, or additionally, a salt (e.g., an ammonium salt) of the short chain carboxylic acid may be added to form the ink formulation. The salt of the short chain carboxylic acid may function as the reducing agent for the palladium salt (and any additional salt, if applicable), generally as described herein with reference to the short chain carboxylic acid. Without wishing to be bound by theory, it is believed that by adding the short chain carboxylic acid in the presence of the complexing agent, an acid-base complex is formed between the short chain carboxylic acid and the complexing agent, thereby preventing the short chain carboxylic acid from reducing the palladium salt (and any additional salt, if applicable) immediately. As the ink formulation is concentrated and the complexing agent is removed by suitable conditions including evaporation, the short chain carboxylic acid becomes liberated and reduction of the palladium salt to elemental palladium (palladium in the zero oxidation state) by the short chain carboxylic acid may occur. When one or more additional metal salts are present (e.g., a silver salt), the additional metal salt(s) will be reduced to their corresponding elemental metal forms too.

Preferably, metal particle formation will only occur after patterning, as evaporation ensues. A highly conductive palladium structure remains after the reduction, even at low processing temperatures, because the low boiling points of non-palladium constituents allow for a controlled and complete or nearly complete removal of the non-palladium constituents. Palladium acetate is advantageously selected as the palladium salt due to the volatility of the conjugate acid of the acetate ligand, acetic acid. In some embodiments, palladium formate can also be used. Additionally, palladium acetate is a normally stable compound that is generally considered nonflammable or non-explosive. Use of palladium acetate may enable creation of a stable, non-explosive palladium precursor ink.

The short chain carboxylic acid may have a chain length of seven carbons or less and typically has a chain length of five carbons or less. Examples of short chain carboxylic acids include, but are not limited to, formic acid, acetic acid, propionic acid, butyric acid, and pentanoic acid. Preferably, the short chain carboxylic acid has a chain length of two carbons or less. More preferably the short chain carboxylic acid is formic acid. Formic acid has been found to be particularly advantageous due to its low boiling point and volatile byproducts. Formic acid comprises an aldehyde functionality, which enhances its reducing ability. As the palladium salt is reduced to elemental palladium, formic acid in turn is oxidized to carbonic acid, which in turn forms carbon dioxide and water, both of which are volatile byproducts. As such, short chain carboxylic acids comprising an aldehyde functionality are preferred short chain carboxylic acids. Additionally, the use of formic acid results in the formation of carbon dioxide and water, leaving no residual reducing agent.

The short chain carboxylic acid is a reducing agent for the palladium salt (or any additional metal salt, when applicable), but due to the complexation with the complexing agent that occurs upon adding the short chain carboxylic acid to the mixture, the acid is substantially prevented from reducing the palladium salt. Generally, reduction of the palladium salt does not occur until the complexing agent is partially or completely evaporated from the ink formulation. The complexing agent may be evaporated after deposition of the ink formulation onto a desired substrate, at which time the acid reduces the palladium salt to form a conductive palladium coating or other palladium structure on the substrate. Alternatively, the complexing agent may be partially evaporated from the ink during a further processing step in order to increase the viscosity of the ink and form a concentrated formulation for use in a printing technique such as direct ink writing. In this case, partial reduction of the palladium salt occurs prior to deposition, such that the ink has a composite structure including a mixture of unreacted palladium salt along with conductive palladium particles (e.g., nanocrystals) formed during the partial reduction. The viscosity of such a composite ink may be tailored for printing techniques such as direct ink writing where the ink must span gaps during fabrication of three-dimensional structures. Evaporation of the complexing agent typically occurs at an elevated temperature below about 150° C., between about 50° C. and 100° C., between about 80° C. and 140° C., between about 80° C. and 120° C., between about 80° C. and 100° C., between about 90° C. and 110° C., between about 70° C. and 100° C., or between about 60° C. and 90° C. The evaporation can occur over a period of minutes or hours, depending on the volatility of the complexing agent and the temperature at which the evaporation is carried out. The complexing agent can also be evaporated at room temperature over a longer time period. In some aspects, the evaporation can be performed under reduced pressure. In embodiments where a silver salt is present as an additional metal salt, UV light can also be used to accelerate the reaction instead of heat, since UV light can reduce silver salts.

It will be readily apparent to one of ordinary skill in the relevant arts that other suitable modifications and adaptations to the methods and applications described herein can be made without departing from the scope of the invention or any embodiment thereof. Having now described the present invention in detail, the same will be more clearly understood by reference to the following Examples, which are included herewith for purposes of illustration only and are not intended to be limiting of the invention.

EXAMPLES

The following non-limiting examples are provided to further illustrate embodiments of the invention disclosed herein. It should be appreciated by those of skill in the art that the techniques disclosed in the examples that follow represent approaches that have been found to function well in the practice of the invention, and thus can be considered to constitute examples of modes for its practice. However, those of skill in the art should, in light of the present disclosure, appreciate that many changes can be made in the specific embodiments that are disclosed and still obtain a like or similar result without departing from the spirit and scope of the invention.

Example 1. Palladium-Silver Ink Composition

Palladium precursor-based inks similar to the reactive silver ink chemistry can be synthesized using a 4:1 ammonia, primary, or secondary amine ratio to the divalent $Pd^{2+}$ ion. Additionally, only a 2:1 ratio of $Pd^{2+}$ to formate ratio is required vs. a 3:1 ratio for $Ag^+$, as $Pd^{2+}$ is a much more efficient catalyst for the decomposition of formate than $Ag^+$. This complex is notably clear or translucent upon full dissolution and chelation of the palladium with any of the above-mentioned nitrogen-containing chemicals and remarkably stable compared to the corresponding solution with $Ag^+$.

An exemplary chemical reaction illustrating the reduction of a $Pd^{2+}$ acetate salt using a primary amine complex (i.e., isoamylamine) and a short carboxylic acid (i.e., formic acid) is provided in Scheme I:

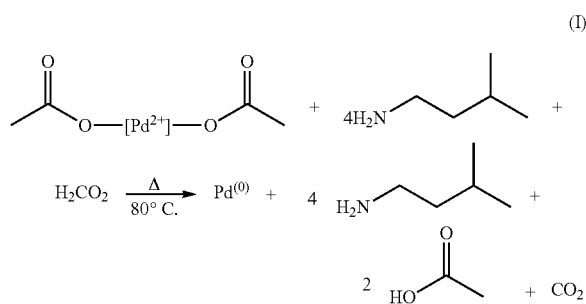

(I)

Without intending to be bound by theory, it is believed that the remarkable stability of the instant palladium ink compositions arises from the lack of light sensitivity of $Pd^{2+}$ as compared to $Ag^+$. For example, a solution of 4:1 ammonia:$Pd^{2+}$ can be stored at room temperature for months in ambient lighting with a stoichiometric excess of formate and no visible precipitation or solution changes. Where a similar solution of silver would begin plating out silver or precipitating silver particles in a matter of 2-3 days.

Since the chemical reduction mechanisms are the same for both silver and palladium, an alloy of silver and palladium can optionally be created for use in a number of applications. Once an atomic percentage of greater than 3% of palladium ions in solution is reached vs. silver ions, a notable increase in solution stability occurs. A similar solution takes 2-3 weeks at room temperature to begin precipitating a metallic composite vs. 2-3 days for pure silver.

The decomposition temperature of the solution can also be lowered to 60° C. due to palladium's greater catalytic activity towards the oxidation of formate species in solution.

Example 2. Alternative Palladium Ink Composition

An alternative palladium ink composition is provided, as follows: 1 gram of Pd(II) acetate is chelated by mixing with a solution of water and 3:1 molar ratio of methoxyethylamine and a 1:1 ratio with amylamine. To this solution is added a molar ratio of 0.8:1 ammonium formate to Pd(II) salt. This translucent solution can then be decomposed to a metallic palladium trace by heating to 120° C. for 10 minutes, yielding a metallic, reflective, and conductive film.

The various methods and techniques described above provide a number of ways to carry out the invention. Of course, it is to be understood that not necessarily all objectives or advantages described may be achieved in accordance with any particular embodiment described herein. Thus, for example, those skilled in the art will recognize that the methods can be performed in a manner that achieves or optimizes one advantage or group of advantages as taught herein without necessarily achieving other objectives or advantages as may be taught or suggested herein. A variety of advantageous and disadvantageous alternatives are mentioned herein. It is to be understood that some preferred embodiments specifically include one, another, or several advantageous features, while others specifically exclude one, another, or several disadvantageous features, while still others specifically mitigate a present disadvantageous feature by inclusion of one, another, or several advantageous features.

Furthermore, the skilled artisan will recognize the applicability of various features from different embodiments. Similarly, the various elements, features and steps discussed above, as well as other known equivalents for each such element, feature or step, can be mixed and matched by one of ordinary skill in this art to perform methods in accordance with principles described herein. Among the various elements, features, and steps some will be specifically included and others specifically excluded in diverse embodiments.

Although the invention has been disclosed in the context of certain embodiments and examples, it will be understood by those skilled in the art that the embodiments of the invention extend beyond the specifically disclosed embodiments to other alternative embodiments and/or uses and modifications and equivalents thereof.

Many variations and alternative elements have been disclosed in embodiments of the present invention. Still further variations and alternate elements will be apparent to one of skill in the art.

In some embodiments, the numbers expressing quantities of ingredients, properties such as molecular weight, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

In some embodiments, the terms "a" and "an" and "the" and similar references used in the context of describing a particular embodiment of the invention (especially in the context of certain of the following claims) can be construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Preferred embodiments of this invention are described herein. Variations on those preferred embodiments will become apparent to those of ordinary skill in the art upon reading the foregoing description. It is contemplated that skilled artisans can employ such variations as appropriate, and the invention can be practiced otherwise than specifically described herein. Accordingly, many embodiments of this invention include all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Furthermore, numerous references have been made to patents and printed publications throughout this specification. Each of the above cited references and printed publications are herein individually incorporated by reference in their entirety.

In closing, it is to be understood that the embodiments of the invention disclosed herein are illustrative of the principles of the present invention. Other modifications that can be employed can be within the scope of the invention. Thus, by way of example, but not of limitation, alternative configurations of the present invention can be utilized in accordance with the teachings herein. Accordingly, embodiments of the present invention are not limited to that precisely as shown and described.

What is claimed is:

1. A method of making a conductive structure comprising palladium, the method comprising:
   combining a metal salt composition comprising a palladium salt and a complexing agent;
   adding a short chain carboxylic acid or salt thereof to the combined metal salt composition and complexing agent to form an ink composition;
   optionally partially evaporating the complexing agent from the ink composition to form a concentrated formulation; and
   reducing the metal salt composition to form a conductive structure comprising palladium, wherein the concentrated formulation and the conductive structure comprising palladium are formed at a temperature of about 120° C. or less.

2. The method of claim 1, wherein the metal salt composition further comprises:
   an additional metal salt, which, when reduced in elemental form, is capable of forming an alloy with palladium.

3. The method of claim 2, wherein the additional metal salt is a silver salt.

4. The method of claim 3, wherein the atomic percentage of the palladium salt is 3% or more than the atomic percentage of the silver salt.

5. The method of claim 1, wherein the temperature is about 90° C. or less.

6. The method of claim 1, wherein the short chain carboxylic acid or the salt of the short chain carboxylic acid is not added until after the palladium salt is dissolved in the complexing agent.

7. The method of claim 1, further comprising depositing the ink composition onto a substrate.

8. The method of claim 7, wherein the ink composition is deposited onto the substrate by a method selected from the group consisting of spray processing, dip coating, spin coating, inkjet printing, and e-jet printing.

9. The method of claim 1, further comprising depositing the concentrated formulation onto a substrate.

10. The method of claim 9, wherein the concentrated formulation is deposited onto the substrate by a method selected from the group consisting of screen printing, roll-to-roll processing, and direct ink writing.

11. The method of claim 1, wherein the conductive structure comprises a resistivity of about $2\times10^{-5}$ Ω·cm or less.

* * * * *